(12) United States Patent
Vera Alarcon

(10) Patent No.: US 11,753,314 B2
(45) Date of Patent: Sep. 12, 2023

(54) EQUIPMENT AND PROCEDURE FOR THE EXTRACTION OF SOLIDS FROM CONTAMINATED FLUIDS

(71) Applicant: Sebastian Vera Alarcon, El Puerto de Sta Maria (ES)

(72) Inventor: Sebastian Vera Alarcon, El Puerto de Sta Maria (ES)

(73) Assignee: WATER CHALLENGE, S.L., Madrid (ES)

( * ) Notice: Subject to any disclaimer, the term of this patent is extended or adjusted under 35 U.S.C. 154(b) by 0 days.

(21) Appl. No.: 17/324,126

(22) Filed: May 19, 2021

(65) Prior Publication Data

US 2022/0363565 A1    Nov. 17, 2022

(30) Foreign Application Priority Data

May 11, 2021   (ES) ............................. ESP202130426

(51) Int. Cl.
*C02F 1/12*          (2023.01)
*C02F 1/04*          (2023.01)
(Continued)

(52) U.S. Cl.
CPC ................ *C02F 1/12* (2013.01); *C02F 1/042* (2013.01); *C02F 1/16* (2013.01); *C02F 1/36* (2013.01);
(Continued)

(58) Field of Classification Search
CPC .... C02F 1/042; C02F 1/12; C02F 1/16; C02F 1/36; C02F 2001/5218; C02F 2103/08; C02F 2209/008; C02F 2209/02; C02F 2209/03; C02F 2209/05; C02F 2209/06; C02F 2209/40; C02F 2209/42
See application file for complete search history.

(56) References Cited

U.S. PATENT DOCUMENTS

| | | | |
|---|---|---|---|
| 6,551,466 B1* | 4/2003 | Kresnyak | B01D 1/2856 |
| | | | 159/901 |
| 7,837,768 B2* | 11/2010 | Sanderson | B01D 19/0005 |
| | | | 210/103 |

(Continued)

*Primary Examiner* — Jonathan Miller

(57) ABSTRACT

Equipment and procedure for extraction of solids from contaminated fluids whose basic purpose is to obtain the crystallised solids from the contaminated fluids, without any type of rejection in order to valorize them and to obtain purified water in a single stage, all in a continuous adiabatic/sonic process with evaporation/crystallisation and with low energy consumption and where the procedure is characterised by being constituted basically by at least three circuits fully interconnected as a single piece of equipment where the first circuit, the principal circuit, is constituted by an inlet duct of the contaminated fluid to be treated (1) followed by a pre-filter (2) followed by a filter for fine particles (3), a heat exchanger of preheated contaminated fluid (5) in the heat exchanger (4), followed by a fluid feedback pump (6) to a nozzle formed by an injector (7) and an ejector (8), which introduce the fluid to an evaporation chamber (9), where the steam that exits is introduced into a closed-loop electromagnetic servomechanism (26), an saturated steam ejector outlet (32), driven to the heat exchanger (4), outlet (13) as purified water from the saturated steam (22).

2 Claims, 1 Drawing Sheet

(51) Int. Cl.
   *C02F 1/16*   (2023.01)
   *C02F 1/36*   (2023.01)
   *C02F 1/52*   (2023.01)
   *C02F 103/08*   (2006.01)

(52) U.S. Cl.
   CPC .. *C02F 2001/5218* (2013.01); *C02F 2103/08* (2013.01); *C02F 2209/008* (2013.01); *C02F 2209/02* (2013.01); *C02F 2209/03* (2013.01); *C02F 2209/05* (2013.01); *C02F 2209/06* (2013.01); *C02F 2209/40* (2013.01); *C02F 2209/42* (2013.01)

(56) References Cited

U.S. PATENT DOCUMENTS

| | | | | |
|---|---|---|---|---|
| 8,623,174 | B1* | 1/2014 | Duesel, Jr | B01D 1/0005 |
| | | | | 261/77 |
| 9,808,739 | B2* | 11/2017 | Fincher | B01D 17/0217 |
| 10,597,573 | B2* | 3/2020 | Rutsch | C09K 8/04 |
| 2007/0045100 | A1* | 3/2007 | Wright | B01D 1/14 |
| | | | | 159/48.1 |
| 2013/0037223 | A1* | 2/2013 | Duesel, Jr. | B01D 1/30 |
| | | | | 159/4.01 |
| 2013/0284582 | A1* | 10/2013 | Booth | C02F 1/06 |
| | | | | 202/178 |
| 2014/0238918 | A1* | 8/2014 | Duesel, Jr. | B01D 1/14 |
| | | | | 210/188 |

* cited by examiner

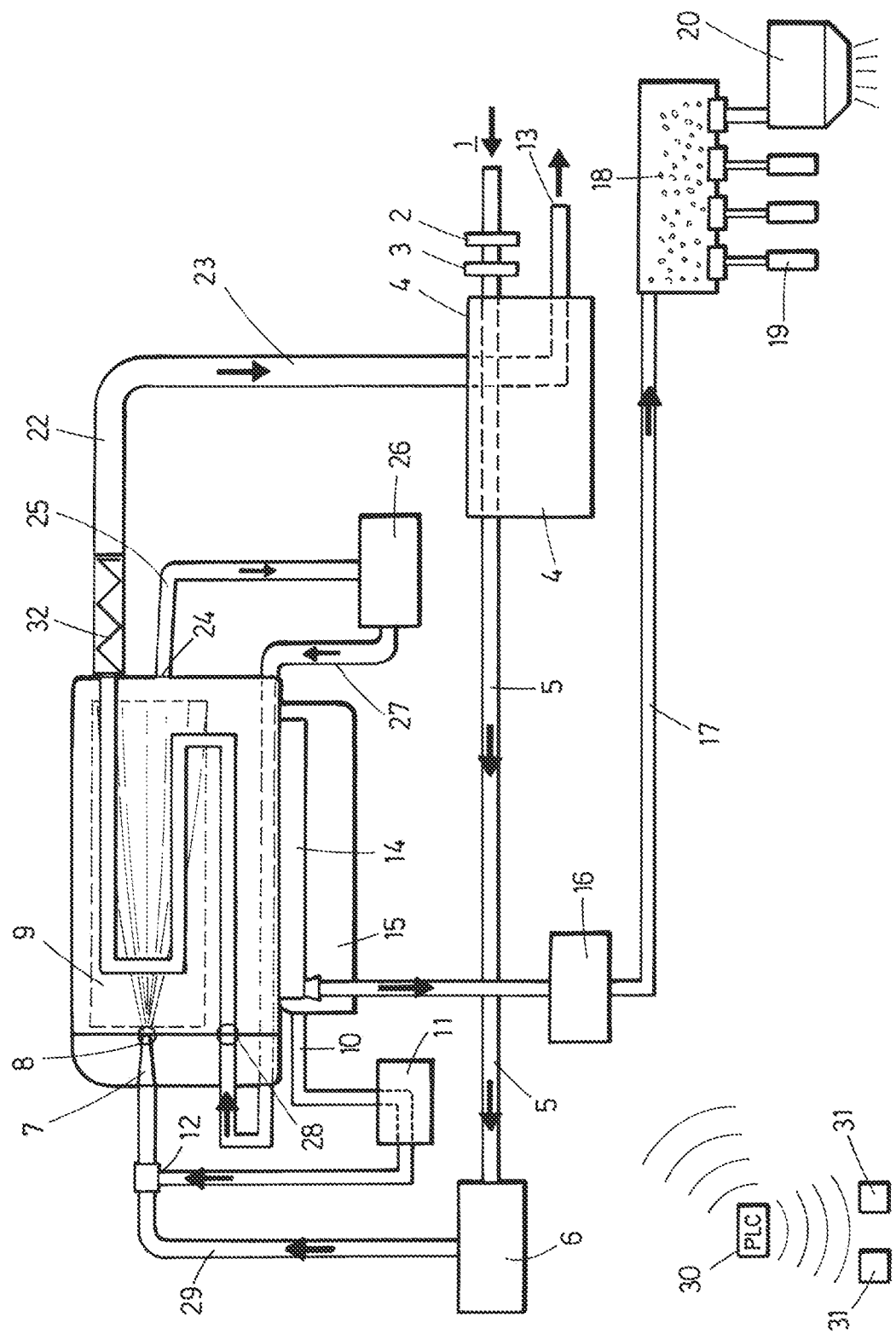

EQUIPMENT AND PROCEDURE FOR THE EXTRACTION OF SOLIDS FROM CONTAMINATED FLUIDS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

STATEMENT REGARDING PRIOR DISCLOSURES BY THE INVENTOR OR A JOINT INVENTOR

Not applicable.

BACKGROUND OF THE INVENTION

The existence of contaminated water coming from industrial, mining, agricultural and processing procedures is a global problem, as well as seawater desalination with a return of 50% of brine and much more, that significantly impact the constant degradation of the environment since they end up contaminating the entire discharge area of contaminated fluids, the rivers that transport them, the nearby aquifers and finally, the sea.

This denotes at least four important problems:
a. pollution,
b. loss of resources in the form of transported solids,
c. considerable expense of a scarce resource such as drinking water,
d. important energy costs At present, the purification techniques of fluids are by mechanical means and by filters, such as reverse osmosis (RO), the MSF, MED and MVC evaporation systems, after evaporation (with an energy consumption of 70-80 kWh/m3) and in order to achieve zero waste, it must crystallise, a very costly operation from the point of view of energy (200-250 kWh/m3).

The energy consumption of this invention is less than 50 kWh/m3 of treated fluid producing 100% of purified water.

In the case of reverse osmosis, the purification rate of fluids is 50%, with the other 50% resulting in a polluting brine.

In order to achieve the purification of contaminating fluids, with an authentic zero discharge, referred to as Zero Liquid Discharge (ZLD), it must first be concentrated by means of reverse osmosis, then the brine that has been produced has to be evaporated and finally crystallised in order to obtain the dry solids. It deals with three technologies, with the different pieces of equipment and three stages, not a continuous process.

Up to now, there has been no treatment that is capable of starting with a contaminated fluid, and in a single, continuous stage and with energy consumption of less than 30 kWh/m3, produce purified water which is "Zero Liquid Discharge" (ZLD), an effective and definitive result, such as that obtained by this invention.

BRIEF SUMMARY OF THE INVENTION

This invention, as expressed in the title of this descriptive report, refers to equipment and procedure for the extraction of solids from contaminated fluids, whose basic aim is to obtain the crystallised solids from the contaminated fluids, without any type of rejection, for their valorization and the obtaining of purified water in a single stage, all in a continuous adiabatic/sonic process and with evaporation/crystallisation and with low energy consumption.

Therefore, the purpose of the patent is to obtain the crystallised solids coming from contaminated fluids in order to evaluate them and also to obtain purified water using the same procedure.

The contaminated fluids, for informative purposes but not limited to this, may be fluids coming from leachates, from waste water treatment plants (WWTP), from mining procedures, from textile procedures, from fluids from treatment coming from the pharmaceutical industry, from brackish water wells, from residual water from trap nets, from slurry, from salty water and brines coming from treatment plants and even radioactive water coming from nuclear plants.

As a result of the treatment of the treated fluid, an amount of recoverable crystallised waste and purified water is obtained; taking into account that it deals with a continuous operation, with the help of renewable energy, as a product of circular economy and with the important characteristic that the procedure is done without rejection, that is, it is a zero liquid discharge (ZLD) procedure.

FIELD OF THE INVENTION

This invention falls within the industry of cleaning and sanitizing contaminated fluids and water and in the auxiliary industry of manufacturing of industrial machines for cleaning of fluids, without being limited to these sectors, being able to be utilised in any other sector.

BRIEF DESCRIPTION OF THE SEVERAL VIEWS OF THE DRAWING

In order to support the description and in order to lead to a better understanding of the characteristics of the invention, there is a sheet of plans, in which references indicate different elements and where, the following has been represented:

FIG. 1. Outline design of all the elements of the fluid cleaning equipment and their relative position.

And in this FIGURE, the same elements have been identified with this numeration.
(1). inlet of fluid to be treated
(2). pre-filter,
(3). filter,
(4). heat exchanger,
(5). preheated fluid,
(6). feedback pump of the fluid,
(7). injector,
(8). ejector,
(9). evaporation chamber,
(10). outlet duct of initial brine,
(11). feedback pump,
(12). inlet of initial brine to the principal circuit,
(13). outlet of purified water,
(14). area of precipitation of solids, (15). crystallisation compartment,
(16). solids discharge device,
(17). outlet tube for crystallised solids,
(18). collection container of crystallised solids,
(19). solids classifier,
(20). container of unclassified solids,
(21). container of steam with solids,
(22). saturated steam,
(23). duct of saturated steam,
(24). outlet of pressurised saturated steam,
(25). pressurised saturated steam,
(26). closed-loop electromagnetic mechanism,
(27). duct of steam to the evaporation chamber,
(28). inlet of steam to the evaporation chamber,
(29). modified fluid inlet,
(30). central data processing unit (PLC),
(31). HMI display and/or Smartphone terminal,
(32). saturated steam outlet ejector.

DETAILED DESCRIPTION OF THE INVENTION

The purpose of this invention is a procedure and the equipment for the extraction of solids that contaminate a fluid; due to the total extraction of these dry solids, the resulting water is purified. We are dealing with a process done in a single and continuous stage.

In the majority of the cases, the dry solids may subsequently be susceptible to valorization.

The contaminated fluid, preheated by a heat exchanger, that comes from the final flash steam of the evaporation in the adiabatic chamber, is driven by means of a pump which inserts it in a nozzle (injector/ejector).

Upon passing this fluid through the injector, it undergoes compression, making the pressure increase, and by passing to the ejector and producing an expansion, this is when a two-phase liquid/steam change takes place, non-thermal but rather kinetic (sonic speeds). It is an atomisation/micronisation, which makes possible a weakening of the hydrogen bridges in the water molecules, making it be faster and less costly in terms of energy to reach the boiling point.

The increase in the pressure of the water molecules that enter in the injector produces an increase in the speed of these molecules and consequently in the speed of the particles that it transports.

Once the fluid is micronised, it is introduced in a specifically designed evaporation chamber, which maintains optimal temperatures for producing boiling (65-120° C.), changing the fluid from a liquid state to steam, suddenly, since unlike the traditional evaporation systems, in this invention, the fluid is not introduced in a liquid state and, secondly, a large amount of energy does not have to be consumed to break the fluid's surface tension. This makes the system be very energy efficient.

The steam produced in the chamber is extracted by a ejector and introduced in a Closed-Loop Electromagnetic Servomechanism (the author's own invention and design), whose acronym is "CLES".

Reaching an overpressure and, therefore, overheated steam, it is reintroduced in the chamber as heat-carrying fluid.

The steam finally produced is extracted from the chamber and introduced in the heat exchanger, where it enters partly condensed, exchanges heat with the entry fluid and the steam flash is condensed, producing purified water.

Within the evaporation chamber, the solids, dissolved in the fluid precipitate by gravity and are reassigned to a water-tight and cased compartment, where with feedback from residual heat, are crystallised, for which reason they are obtained completely dry, prepared to be classified, separated and/or evaluated.

This invention includes all the possible combinations of uses and final uses in the extraction of solids from contaminating fluids, with zero liquid discharge (ZLD) to both the atmosphere and the environment.

DESCRIPTION OF THE PREFERRED EMBODIMENT

This invention, refers to the equipment and procedure for the extraction of solids from contaminated fluids whose basic aim is to obtain the crystallised solids from the contaminated fluids, without any type of rejection, for their valorization and the obtaining purified water in a single stage, all in a continuous adiabatic/sonic process with evaporation/crystallisation and with low energy consumption.

In a preferred realisation of the invention, the treatment equipment is constituted basically by at least three fully interconnected circuits in a single piece of equipment.

The first circuit, the principal circuit, is constituted by an inlet duct of the fluid to be treated (1) placing next a pre-filter (2) followed by fine-particle filters (3), a heat exchanger (4), a complex cylindrical device with two inlets and two outlets, an inlet duct of contaminated fluid with outlet on the opposite side at a higher temperature since through the other upper inlet the saturated steam (22) arrives which releases heat to the contaminated fluid and which exits through the outlet (13) in the form of purified water and where the contaminated fluid preheated (5) in the heat exchanger (4) is driven by means of a feedback pump of the fluid (6) to a nozzle formed by an injector (7) and an ejector (8) from where it passes to the evaporation chamber (9) from which the pressurised saturated steam exits through the outlet (24), passing a closed-loop electromagnetic servomechanism (26) and is conveyed to the inlet of the evaporation chamber (9) and at the end of a winding circuit it is extracted by a saturated steam ejector (32) and conveyed to the heat exchanger (4) leaving through the outlet (13) as purified water.

The second circuit is constituted by an area for the precipitation of solids (14), within the evaporation chamber, from which the cited solids pass to the crystallisation compartment (15), where they are crystallised with the help of residual heat and by means of the solid discharge device (16) they pass on to a traditional transport device, which could be an endless belt or a continuous screw, that transports them to a crystallised solids collection container (18) passing to a solids classifier (19) and the remainder to an unclassified solids container (19).

The third circuit, of feedback of the initial brine, is constituted by a supply duct (10) from the evaporation chamber (9) to a feedback pump (11) that is incorporated to the principal circuit through the inlet (12) located a short distance from the nozzle.

The automation of the process is done by a central data processing unit (PLC) and by means of an HMI display and/or Smartphone terminal for the users.

The process of extracting solids from contaminated fluids that the invention advocates begins in the first circuit, the principal circuit, where the inlet of fluid to be treated (1) is located, placing then a pre-filter (2) for large particles, up to 20 mm, followed by a filter for thin particles up to 2 mm, then the fluid enters into the heat exchanger (4), a complex device with two inlets and two outlets, an inlet duct for contaminated fluid with an outlet on the opposite side at a higher temperature since through the other upper inlet the saturated steam (22) arrives where it enters partly condensed which heats the contaminated fluid and that, at the same time, after the loss of the exchanged heat, exits through the outlet (13) in the form of purified water.

The contaminated fluid (5) preheated in the heat exchanger (4) at atmospheric pressure and with a temperature under 100° C. is driven by means of a feedback pump of the fluid (6) to a nozzle formed by an injector (7) and an ejector (8) and where this fluid, by passing through the injector (7), undergoes compression, causing the pressure to increase and the increase in the pressure of these water molecules that enter in the injector (7) produces an increase in the speed of these molecules and consequently of the speed of the particles that it transports and that by passing it to the ejector (8) and producing an expansion, this is when a two-phase liquid/steam change takes place, not a thermal change but kinetic, at sonic speeds, producing an atomisation/micronisation, that makes possible a weakening of the hydrogen bridges in the water molecules, making it faster and less costly in terms of energy to reach the boiling point.

Micronisation is the physical process that allows reducing the particles of a material to sizes below 10 micras, and it is produced by the impact that the particles undergo, which are circulating in the interior of a chamber at high speed, when they collide with the particles that are introduced in the chamber. The higher the speed of the particles that circulate in the interior of the chamber, the greater will be the impact and, therefore, the obtained particles will be finer.

Micronisation produces many benefits in addition to those obtained by any other technique used to reduce the particle size, such as finer particle sizes and a more homogeneous distribution of the size of particles (PSD).

Once the fluid is micronised, it is introduced in the evaporation chamber (9) constituted by a volume of special trapezoidal design, which maintains optimal temperatures to produce boiling (65-120° C.), changing the fluid from a liquid state to steam suddenly, since, unlike the traditional evaporation systems, in this invention, first, the fluid is not introduced in a liquid phase, and second, a large amount of energy does not have to be consumed in order to break the surface tension of the fluid. This makes the system be very efficient in terms of energy.

The pressurised saturated steam exits through an outlet (24) from the middle part of the evaporation chamber (9) and passes through a closed-loop electromagnetic servomechanism (26) that regenerates the steam produced, increasing its pressure and thereby over-heating it, causing the specific energy consumption to decrease and, through n duct (27) it is reintroduced into the evaporation chamber (9) where this steam, acting as a heat-carrying fluid, runs through a winding circuit within this chamber and is finally extracted by a saturated steam ejector (32), being driven as saturated steam (22) to the heat exchanger (4) exiting through an outlet (13) as purified water.

The solids precipitated within the evaporation chamber (9) fall to the lower area called the solids precipitation area (14), from there the cited solids pass to the crystallisation compartment (15), a watertight and cased compartment where, through the application of residual heat, the totality of the dissolved solids become crystallised and by means of the solids discharge device (16) they pass to a traditional transport device which could be an endless belt or a continuous screw that takes them to a collection container of crystallised solids (18) passing then to a solids classifier (19) and the remainder to a unclassified solids container (19).

The initial brine feedback circuit, called the third circuit, is constituted by a brine feed duct (10) from the evaporation chamber (9) to a feedback pump (11) that incorporates it to the principal circuit through the inlet (12) located a short distance from the nozzle.

The entire process is automated, being managed and controlled by a central data processing unit (PLC), of specific design, in which the variables of temperature, pressure, flow, level, conductivity and pH are regulated, linked to a series of closed control field actuators and basic inspection circuits, with logical and digital wiring, with special consideration to the subject of acquisition, display and treatment of the data of the process and variables involved in the process, through remote 4G and 5G control signals, all this in a safe, efficient form, easy to handle by the future users through an HMI display and/or Smartphone terminal.

Having sufficiently described the nature of the invention, as well as the way to put it into practice, it should be noted that the devices indicated above and represented in the attached drawings are susceptible to modification in details that do not alter their fundamental principles, established in the previous paragraphs and summarised in the following claims.

The invention claimed is:

1. Equipment for the extraction of solids from contaminated fluids to obtain crystallised solids from contaminated fluids, without any type of rejection in order to valorize them and to obtain purified water in a single stage, all in a continuous adiabatic/sonic process with evaporation/crystallisation and with low energy consumption, comprising:
   at least three interconnected circuits that form a single piece of the equipment where the first circuit, as the principal circuit, is constituted by:
      an inlet duct (1) of contaminated fluid to be treated
      a pre-filter (2)
      a filter (3) for fine particles,
      a heat exchanger (4), with two inlets and two outlets, where one outlet is for
      a preheated contaminated fluid (5) heated in the exchanger (4) and followed by
      a feedback pump (6) of the fluid
      a nozzle formed by an injector (7) and an ejector (8),
      an evaporation chamber (9),
      a closed-loop electromagnetic servomechanism (26),
      an ejector outlet (32) of saturated steam,
      a heat exchanger (4),
      an outlet (13) for purified water
   the second circuit is constituted by:
      an area (14) for the precipitation of solids, within the evaporation chamber (9),
      a crystallisation compartment (15),
      a solid discharge device (16),
      an endless belt or continuous screw,
      a collection container (18) for crystallised solids
      a solids classifier (19),
      a container for unclassified solids (19),
   the third circuit, of initial brine feedback, is constituted by
      a feeding duct (10) from the evaporation chamber (9),
      feedback pump (11),
      an inlet (12) for incorporation of the initial brine to the principal circuit
   and control elements comprising:
      a central data processing unit (PLC),
      an HMI display and/or Smartphone terminal for users.

2. A procedure utilizing the equipment of claim 1 wherein the procedure comprises the following steps:

in the first circuit, a contaminated fluid to be treated is provided to the inlet (1), then goes through the pre-filter (2) for larger particles, up to 20 mm, followed by a filter (3) for fine particles of up to 2 mm, then the fluid enters into the heat exchanger (4), a cylindrical device with two inlets and two outlets, an inlet duct for contaminated fluid with an outlet on the opposite side at a higher temperature since through the other upper inlet the saturated steam (22) enters partly condensed which heats the contaminated fluid to be treated (1) and, after the loss of the exchanged heat, exits through an outlet (13) in the form of purified water;

the contaminated fluid (1) already preheated in the heat exchanger (4) at atmospheric pressure and with a temperature under 100° C. is driven by means of the fluid feedback pump (6) to a nozzle formed by an injector (7) and an ejector (8) and where this fluid, by passing through the injector (7), undergoes compression, causing the pressure to increase and the increase in the pressure of the water molecules causes an increase in the speed of the particles that it transports and that by passing to the ejector (8) and producing an expansion, provoke a two-phase liquid/steam change at sonic speed, producing an atomisation/micronisation, that weakens the hydrogen bridges in the water molecules, making reaching the boiling point faster;

once the fluid is micronised, it is introduced in an evaporation chamber (9) constituted by a volume of trapezoidal design, which maintains optimal temperatures to produce boiling (65-120° C.), changing the fluid from a liquid state to steam suddenly;

a pressurised saturated steam exits through an outlet (24) from the middle part of the evaporation chamber (9) and passes through the closed-loop electromagnetic servomechanism (26) that regenerates the steam produced, increasing its pressure and thereby over-heating the steam, causing the specific energy consumption to decrease and, through a duct (27) the steam is reintroduced in the evaporation chamber (9) where the steam, acting as a heat-carrying fluid, runs through a winding circuit within the chamber and finally is extracted by a saturated steam ejector (32), being driven as saturated steam (22) to the heat exchanger (4) exiting through an outlet (13) as purified water;

the solids precipitated within the evaporation chamber (9) fall to a lower area called the solids precipitation area (14), and next the precipitated solids pass to a crystallisation compartment (15), a watertight and cased compartment where, through the application of residual heat, the totality of the dissolved solids become crystallised and by means of a solids discharge device (16) the solids pass to a transport device comprising an endless belt or a continuous screw that takes the solids to the collection container of crystallised solids (18) passing then to a solids classifier (19) and the remainder to the unclassified solids container (19);

the initial brine feedback circuit, called the third circuit, is constituted by a brine feed duct (10) that goes from the evaporation chamber (9) to a feedback pump (11) that incorporates the brine to the principal circuit through the inlet (12) located at a short distance from the nozzle;

the procedure is automated, being managed and controlled by the central data processing unit (PLC), of specific design, in which the variables of temperature, pressure, flow, level, conductivity and pH are regulated, linked to a series of closed control field actuators and basic inspection circuits, with logical and digital wiring, with special consideration to the subject of acquisition, display and treatment of the data of the process and variables involved in the process, through remote 4G and 5G control signals, by the users through an HMI display and/or a Smartphone terminal.

* * * * *